United States Patent
Robinson et al.

(10) Patent No.: US 8,892,707 B2
(45) Date of Patent: Nov. 18, 2014

(54) IDENTIFICATION OF VIRTUAL APPLICATIONS FOR BACKUP IN A CLOUD COMPUTING SYSTEM

(75) Inventors: Matthew Douglas Robinson, Sunnyvale, CA (US); Keith J. Tenzer, Munich (DE)

(73) Assignee: NetApp, Inc., Sunnyvale, CA (US)

( * ) Notice: Subject to any disclaimer, the term of this patent is extended or adjusted under 35 U.S.C. 154(b) by 534 days.

(21) Appl. No.: 13/086,287

(22) Filed: Apr. 13, 2011

(65) Prior Publication Data

US 2014/0082166 A1     Mar. 20, 2014

(51) Int. Cl.
    *G06F 15/173*     (2006.01)

(52) U.S. Cl.
    USPC ........... 709/223; 709/203; 709/220; 709/221; 709/222; 709/224; 709/226; 709/227; 711/162; 707/645; 707/650; 718/102; 718/104

(58) Field of Classification Search
    USPC ........... 709/203, 220–224, 226–227; 711/162
    See application file for complete search history.

(56) References Cited

U.S. PATENT DOCUMENTS

| | | | | |
|---|---|---|---|---|
| 2003/0191796 A1* | 10/2003 | Hershenson et al. | ......... | 709/200 |
| 2007/0192329 A1* | 8/2007 | Croft et al. | ...................... | 707/10 |
| 2007/0214456 A1* | 9/2007 | Casey et al. | .................... | 718/100 |
| 2007/0244938 A1* | 10/2007 | Michael et al. | ............... | 707/204 |
| 2007/0271428 A1* | 11/2007 | Atluri | ........................... | 711/162 |
| 2009/0106409 A1* | 4/2009 | Murata | ......................... | 709/223 |
| 2009/0216970 A1* | 8/2009 | Basler et al. | ................... | 711/162 |
| 2009/0288084 A1* | 11/2009 | Astete et al. | ...................... | 718/1 |
| 2010/0011178 A1* | 1/2010 | Feathergill | ..................... | 711/162 |
| 2010/0070725 A1* | 3/2010 | Prahlad et al. | ............... | 711/162 |
| 2010/0115332 A1* | 5/2010 | Zheng et al. | ...................... | 714/6 |
| 2010/0241673 A1* | 9/2010 | Wu et al. | ....................... | 707/812 |
| 2011/0041171 A1* | 2/2011 | Burch et al. | ...................... | 726/7 |
| 2011/0072424 A1* | 3/2011 | Choi et al. | ..................... | 717/174 |
| 2011/0154331 A1* | 6/2011 | Ciano et al. | ........................ | 718/1 |
| 2012/0180044 A1* | 7/2012 | Donnellan et al. | ................ | 718/1 |

* cited by examiner

*Primary Examiner* — Kamal Divecha
*Assistant Examiner* — Thao Duong
(74) *Attorney, Agent, or Firm* — Mahamedi Paradice LLP (57) ABSTRACT

Exemplary embodiments provide various techniques for identifying a virtual application for backup in a cloud computing system. A cloud service layer of the cloud computing system is queried for a listing of virtual applications. In response to the querying, an attribute associated with the virtual application is received from the cloud service layer. The attribute associated with the virtual application is then transformed into an attribute associated with a hypervisor-managed virtual machine, and this transformation of the attribute exposes the hypervisor-managed virtual machine associated with the virtual application such that the hypervisor-managed virtual machine is identifiable for backup. As a result, the virtual application can be backed up based on the attribute of the hypervisor-managed virtual machine.

13 Claims, 11 Drawing Sheets

IDENTIFICATION OF VIRTUAL APPLICATIONS FOR BACKUP IN A CLOUD COMPUTING SYSTEM

FIELD

The present disclosure relates generally to storage systems. In an exemplary embodiment, the disclosure relates to the identification of virtual applications for backup in a cloud computing system.

BACKGROUND

In general, cloud computing is a model for enabling on-demand network access to a shared pool of configurable computing resources. Many cloud computing systems accommodate multi-tenancy support, which provides service providers with the ability to create virtualized, separate tenants using the same infrastructure. A "tenant" refers to a user having his own set of data that remains logically isolated from data that belongs to other tenants. Thus, each tenant can have its own virtual applications, each of which is associated with one or more virtual machines.

However, support for multi-tenancy also creates an additional level of abstraction between the tenants and a storage level of the cloud computing system. With this new level of abstraction, virtual applications are difficult to back up because the abstraction hides the identifiers used to identify all the different virtual subcomponents (e.g., virtual machines) that together, comprise a virtual application.

SUMMARY

Exemplary embodiments provide various techniques for identifying one or more virtual applications for backup in a cloud computing system. To back up a particular virtual application, subcomponents associated with a virtual application (e.g., hypervisor-managed virtual machines) are identified. In the identification, the cloud service layer is queried for a listing of virtual applications. In response to the query, an attribute associated with the virtual application is received from the cloud service layer. An example of such an attribute includes a listing of hypervisor-managed virtual machines that are associated with the particular virtual application. As an example, this listing may include identifiers used by the virtual applications to identify each of the hypervisor-managed virtual machines.

Upon receipt, the attribute is then transformed into a different attribute associated with a hypervisor-managed virtual machine. An example of this different attribute can include a listing of identifiers used by the virtual center layer to identify each of the hypervisor-managed virtual machines. The transformation therefore exposes the otherwise hidden hypervisor-managed virtual machines that are associated with a particular virtual application. With the hypervisor-managed virtual machines identified, a request can then be made to the virtual center layer to back up the identified hypervisor-managed virtual machines.

BRIEF DESCRIPTION OF DRAWINGS

The present disclosure is illustrated by way of example and not limitation in the figures of the accompanying drawings, in which like references indicate similar elements and in which.

DESCRIPTION OF EXEMPLARY EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
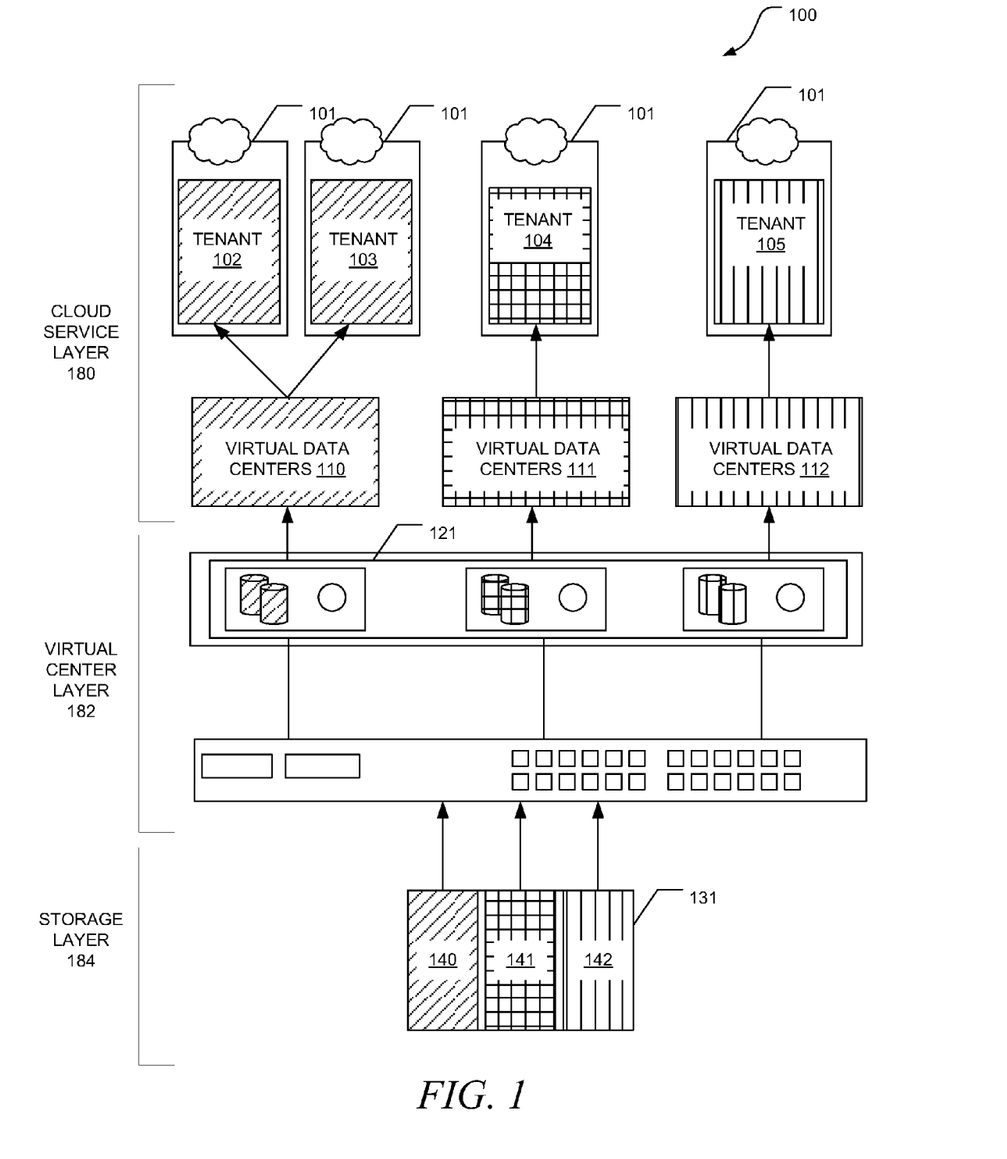
FIG. 1 is an architectural diagram of a high-level overview of an example of a cloud computing system.

FIG. 1 is an architectural diagram of a high-level overview of an example of a cloud computing system 100. Generally, cloud computing is a model for enabling on-demand network access to a shared pool of configurable computing resources (e.g., networks, servers, storage, applications, and services) that can be provisioned and released with minimal management effort or service provider interaction. An example of such a cloud computing system 100 is depicted in FIG. 1. In this example, the cloud computing system 100 can be divided into a cloud service layer 180, a virtual center layer 182, and a storage layer 184.

The cloud service layer 180 includes client computing devices 101 in communication with virtual data centers 110-112. The cloud service layer 180 is an abstraction layer on top of the virtual center layer 182 and, as explained in more detail below, abstracts the resources managed by the virtual center layer 182. This cloud service layer 180 provides support for multi-tenancy, which generally refers to a principle in software architecture where a single instance of a software runs on a server, serving multiple client tenants 102-105. As used herein, a "tenant" refers to a user having his own set of data that remains logically isolated from data that belongs to other tenants. Each tenant 102, 103, 104, or 105 has access to a self-service portal with its own virtual data center 110, 111, or 112. A virtual data center 110, 111, or 112 can be an abstract object that defines a logical group of virtual appliances, and depending on each tenant's requirement, each tenant 102, 103, 104, or 105 maps to a virtual data center 110, 111, or 112. In the cloud service layer 180 depicted in FIG. 1, tenant 104 maps to virtual data center 111, tenant 105 maps to virtual data center 112, and tenants 102 and 103 map to virtual data center 110.

The virtual center layer 182 provides the computing resources for the virtual data centers 110-112, where each virtual data center 110, 111, or 112 has a defined set of computing resources. The virtual center layer 182 provides a cloud operating system 121 that is able to manage large pools of virtualized computing infrastructure, including software and hardware. It should be noted that within the cloud operating system 121, computing resources are partitioned into virtual data center groups to provide resources to the virtual data centers 110-112. Such a separation of tenant and resources provide an additional level of security as well as independent scaling of tenant and management of resources.

The storage layer 184 provides storage resources for the virtual data centers 110-112. In one example, the storage layer 184 can include one or more network attached storage (NAS) devices 131 that support multi-tenancy architecture. When used within a NAS environment, the NAS devices 131 may be embodied as one or more file servers that are configured to operate according to a client/server model of information delivery to thereby allow multiple client computing devices (clients) 101 to access shared resources, such as files, stored on the file servers. The storage of information on a NAS environment can be deployed over a computer network that includes a geographically distributed collection on interconnected communication links, such as Ethernet, that allows client computing devices 101 to remotely access the information (e.g., files) on the file server. The client computing devices 101 can communicate with the file server by exchanging discrete frames or packets of data according to predefined protocols, such as Transmission Control/Internet Protocol (TCP/IP). These NAS devices 131 enable the creation of isolated logical partitions 140-142 on a single NAS device 131 such that no information on a secured virtual partition can be accessed by unauthorized tenants 102-105.

Figure 2:
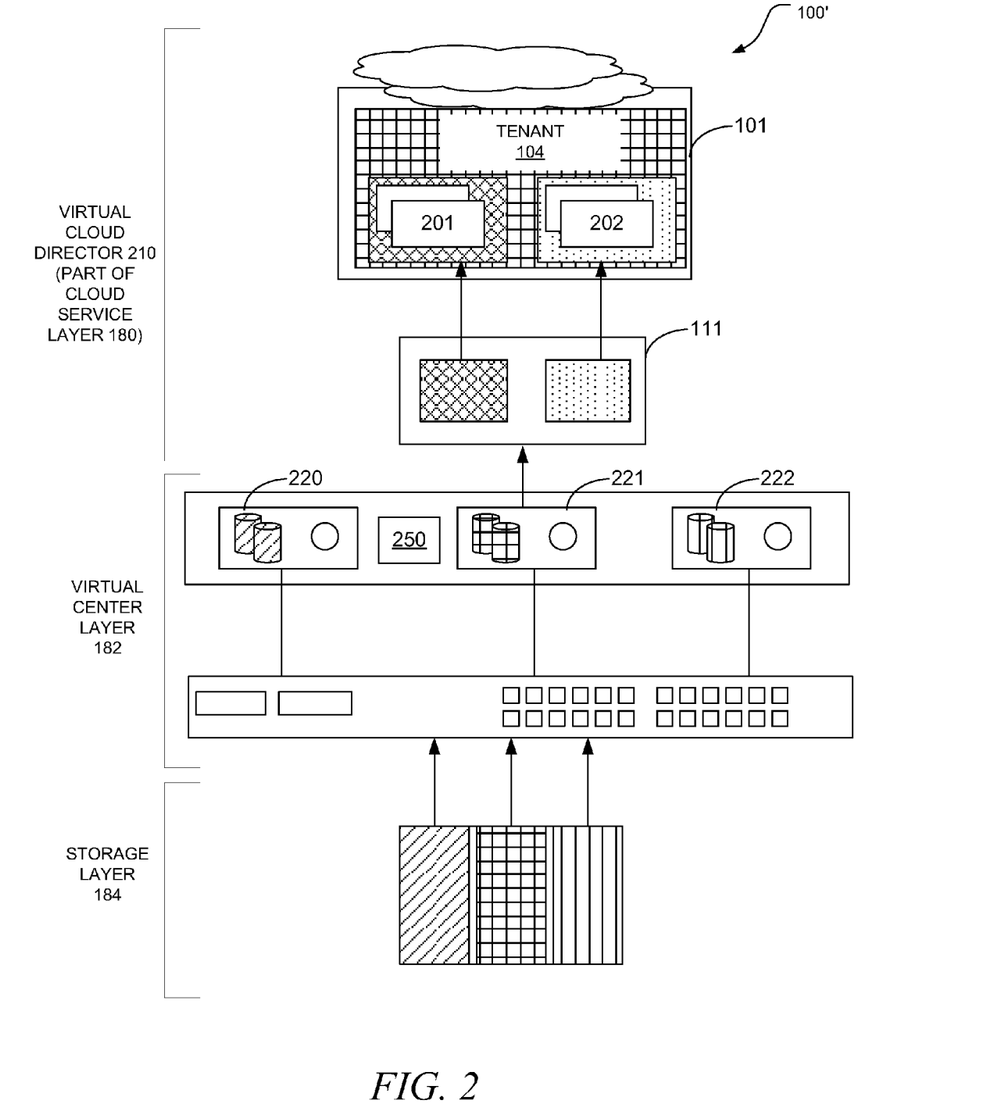
FIG. 2 is an architectural diagram of a more detailed overview of the example of the cloud computing system depicted in FIG. 1.

FIG. 2 is an architectural diagram of a more detailed overview of the example of the cloud computing system 100 depicted in FIG. 1. In reference to FIG. 2, the cloud computing system 100' again can be divided into a cloud service layer 180, a virtual center layer 182, and a storage layer 184. However, in this embodiment, the cloud service layer 180 comprises a virtual cloud director 210. The virtual cloud director 210 abstracts resources that are managed in the virtual center layer 182. In general, the virtual cloud director 210 abstracts virtual center resources by providing different names and groupings. For example, a virtual data center 111 points to a virtual center server for resources and resource pools, and virtual applications 201 and 202 are deployed to virtual data centers (e.g., virtual data center 111), which comprise of one or more hypervisor-managed virtual machines 220-222 on the virtual center server environment. In short, virtual cloud director 210 uses its own definition of objects, and those objects may have different names and associations at the virtual center layer 182. The virtual cloud director 210 combines these resources into large pools for consumption by tenant 104. Examples of resource types that can be pooled include computing clusters and resource pools, network digital-video switches and port groups, virtual machine file systems, and network file system shares. Additionally, the virtual cloud director 210 also adds a self-service portal.

Here, tenant 104 has access to a self-service portal with its own data center 111. This example of the cloud computing system 100' supports the creation of virtual applications 201 and 202. A "virtual application," as used herein, refers to a logical entity comprising a number of hypervisor-managed virtual machines 220-222 that encapsulate a component of a multitier application. In other words, a virtual application is a logical container for one or more hypervisor-managed virtual machines 220-222. It should be appreciated that a "virtual machine," as used herein, is a software emulation of a programmable machine, where the software implementation is constrained within another computer at a higher or lower level of symbolic abstraction. A "hypervisor" (or "virtual machine manager") refers to a program that allows multiple operating systems to share a single hardware host. The hypervisor provides operating systems a virtual operating platform and monitors the execution of the operating systems.

It should be noted that each virtual cloud director (e.g., virtual cloud director 210) can have one or more virtual data centers (e.g., virtual date center 111) per tenant (e.g., tenant 104), and the virtual applications 201 and 202 are included within the virtual data centers. As a result, a customer (e.g., tenant 104) can buy information technology space from a cloud provider, which manages the tenants (including tenant 104) through a single virtual cloud director 210 (or a cloud service layer). Each tenant (e.g., tenant 104) can have one or more virtual data centers (e.g., virtual data center 111) that run virtually in separate physical locations. These virtual data centers can run one or more virtual applications (e.g., virtual applications 201 and 202).

In the virtual center layer 182, one or more physical computing devices host the hypervisor-managed virtual machines 220-222. Alternatively, the virtual center layer 182 itself may be hosted on a hypervisor-managed virtual machine. Virtual applications 201 and 202 may allow multi-tier applications to be encapsulated using the open virtualization format (OVF) standard, which includes operational policies and service levels. Within a virtual application 201 or 202, a tenant 104 can, for example, set power-on sequencing options, control resource allocation, and provide additional customization as required by the application. A virtual application 201 or 202 also enables transfer of application between clouds.

In the embodiment depicted in FIG. 2, the virtual center layer 182 can host a virtual application backup module 250. In general, the virtual application backup module 250 is configured to identify one or more virtual applications 201 and 202 for backup in a cloud computing system 100'. As explained in more detail below, the virtual application backup module 250 identifies or exposes the hypervisor-managed virtual machines 220-222 associated with one or more virtual applications 201 and 202 designated for backup. As used herein, a hypervisor-managed virtual machine is "exposed" when its identifier (e.g., name or pointer) can be identified by the virtual center layer 182 in a backup operation. With the hypervisor-managed virtual machines 220-222 exposed, the virtual application backup module 250 can back up the hypervisor-managed virtual machines 220-222.

Figure 3:
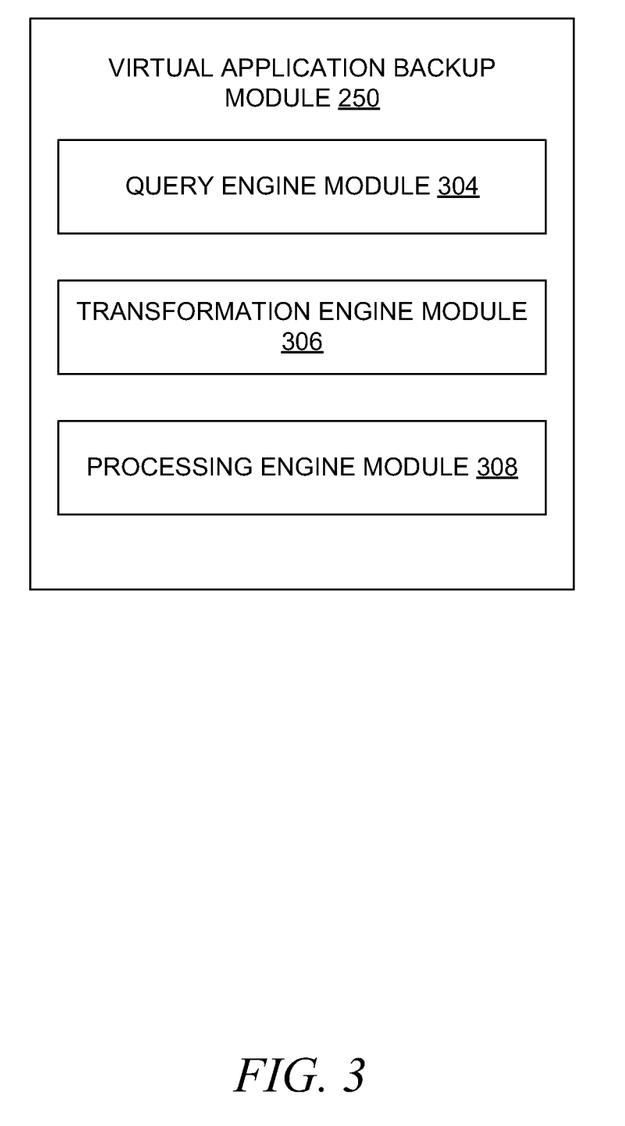
FIG. 3 depicts a block diagram of a virtual application backup module, in accordance with some embodiments of the present invention.

FIG. 3 depicts a block diagram of a virtual application backup module 250, in accordance with some embodiments of the present invention. The virtual application backup module 250 may be executed or included in a cloud computing system (such as cloud computing system 100 of FIG. 1). For example, in an embodiment, the virtual application backup module 250 may form a part of the virtual center layer 182 depicted in FIG. 2. In various embodiments, the virtual application backup module 250 may be used to implement computer programs, logic, applications, methods, processes, or software to identify the virtual application for backup in a cloud computing system, as described in more detail below.

As depicted in FIG. 3, the virtual application backup module 250 can include a query engine module 304, a transformation engine module 306, and a processing engine module

308. The query engine module 304 is configured to query a cloud service layer (such as cloud service layer 180 of FIG. 2) of a cloud computing system for various information. Examples of information include a listing of virtual applications, a listing of tenants, a listing of virtual data centers, and other information, some of which are described in more detail below. The transformation engine module 306 is configured to transform information queried from the query engine module 304 into an attribute associated with a hypervisor-managed virtual machine. This attribute identifies the hypervisor-managed virtual machines that are associated with one or more virtual applications. As explained in more detail below, the transformation engine module 306 can use a variety of different transformation techniques to identify such attributes. With the hypervisor-managed virtual machines identified, the processing engine module 308 can then back up the hypervisor-managed virtual machines associated with one or more virtual applications.

It should be appreciated that in other embodiments, the virtual application backup module 250 may include fewer or more modules apart from those shown in FIG. 3. For example, in an alternate embodiment, the transformation engine module 306 can be integrated within the query engine module 304. The modules 304, 306, and 308 may be in the form of software that is processed by a processor. In another example, as explained in more detail below, the modules 304, 306, and 308 may be in the form of firmware that is processed by application specific integrated circuits (ASIC), which may be integrated into a circuit board. Alternatively, the modules 304, 306, and 308 may be in the form of one or more logic blocks included in a programmable logic device (for example, a field programmable gate array). The described modules 304, 306, and 308 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
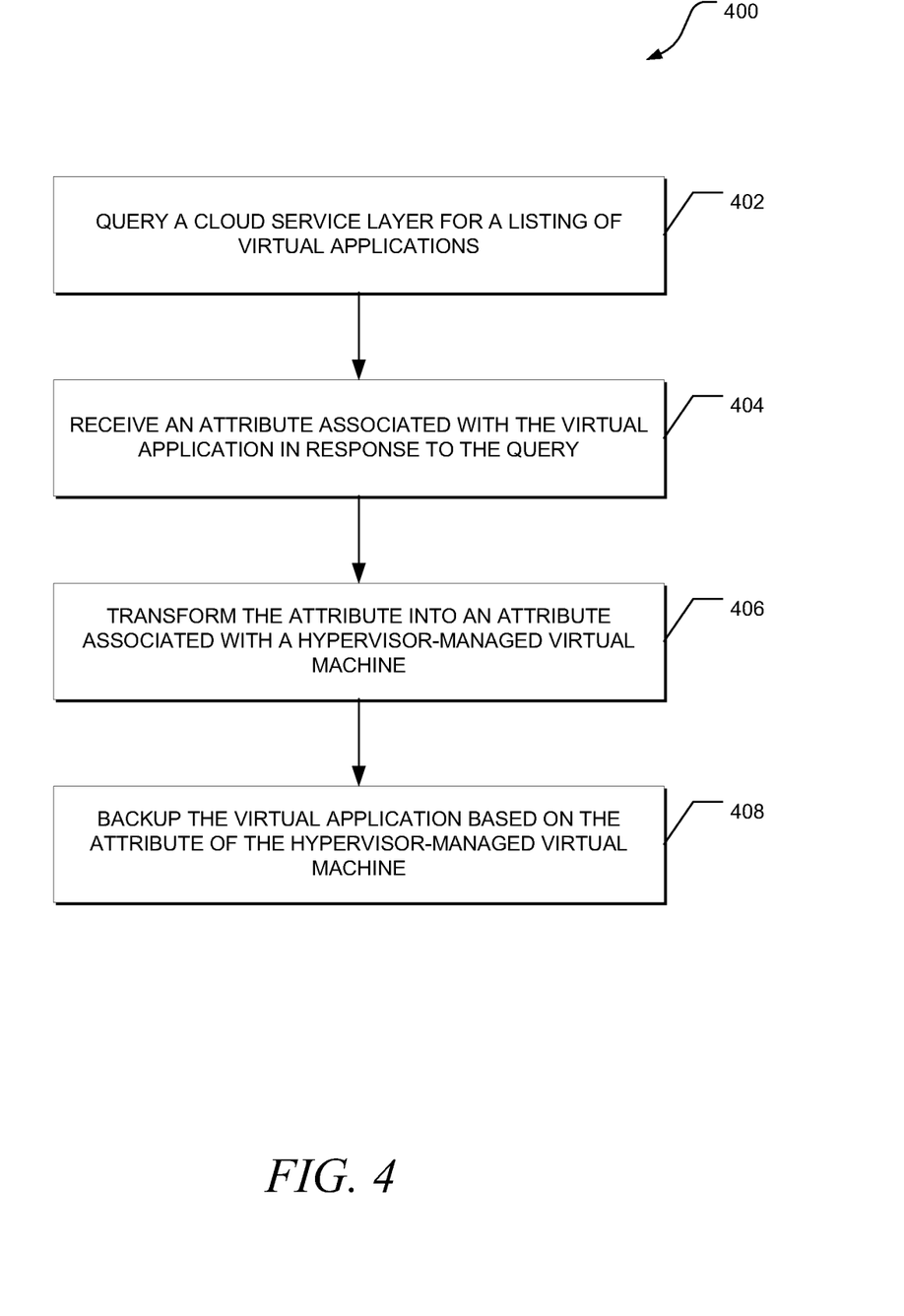
FIG. 4 depicts a flow diagram of a general overview of a method, in accordance with an embodiment, for identifying one or more virtual applications for backup in the cloud computing system.

FIG. 4 depicts a flow diagram of a general overview of a method 400, in accordance with an embodiment, for identifying one or more virtual applications for backup in a cloud computing system. In some exemplary embodiments, the method 400 may be implemented by the virtual application backup module 250 of FIG. 3 and employed in, for example, the virtual center layer 182 of FIG. 2.

As depicted in FIG. 4, a virtual application backup module can query, at 402, a cloud service layer of a cloud computing system for a listing of virtual applications. In response to the query, the virtual application backup module receives, at 404, one or more attributes associated with the virtual application from the cloud service layer. An attribute associated with a virtual application refers to a property or feature associated with a virtual application. An example of such an attribute includes an identifier used by the virtual application to identify the hypervisor-managed virtual machine. To obtain the attribute associated with the virtual application, the virtual application backup module transmits a number of different queries to the cloud service layer for different information, the details of which are explained below.

With the receipt of the attribute associated with a virtual application, the virtual application backup module transforms this attribute, at 406, into a different attribute associated with the hypervisor-managed virtual machine. Here, this different attribute associated with the hypervisor-managed virtual machine refers to a property or feature associated with the hypervisor-managed virtual machine itself. An example of such an attribute is a name used by a virtual center to identify a hypervisor-managed virtual machine. Another example of an attribute includes a pointer used by a virtual center to identify the hypervisor-managed virtual machine. Here, the virtual application backup module transforms this attribute to expose or identify the hypervisor-managed virtual machine such that the hypervisor-managed virtual machine can be identified in a backup operation. With this identification, a virtual application can therefore be backed up without need to interface with the cloud service layer. In other words, with the hypervisor-managed virtual machines associated with a virtual application identified, a user can directly transmit commands to the virtual center layer to backup the virtual application, instead of making a backup request through the cloud service layer, which might not provide any backup functionalities or might provide backup functionalities that are not useful for a user. There are a variety of different transformation techniques used by the virtual application backup module, some of which are explained in more detail below.

After the transformation, the virtual application is backed up at 408 based on the attribute of the hypervisor-managed version machine. As explained in more detail below, once a number of hypervisor-managed virtual machines associated with a virtual application are identified, the virtual application backup module can backup the identified hypervisor-managed virtual machines. It should be appreciated that a number of different backup techniques may be used to back up the virtual application (or hypervisor-managed virtual machines associated with the virtual application). In one example, a snapshot of the hypervisor-managed virtual machines may be taken. A snapshot is a point-in-time representation of a storage element, such as an active file system, file or database, stored on a persistent storage device and having a name or other identifier that distinguishes it from other snapshots taken at other points in time. In a write-anywhere file system, a snapshot is an active file system image that contains complete information about the file system, including metadata.

Figure 5A:
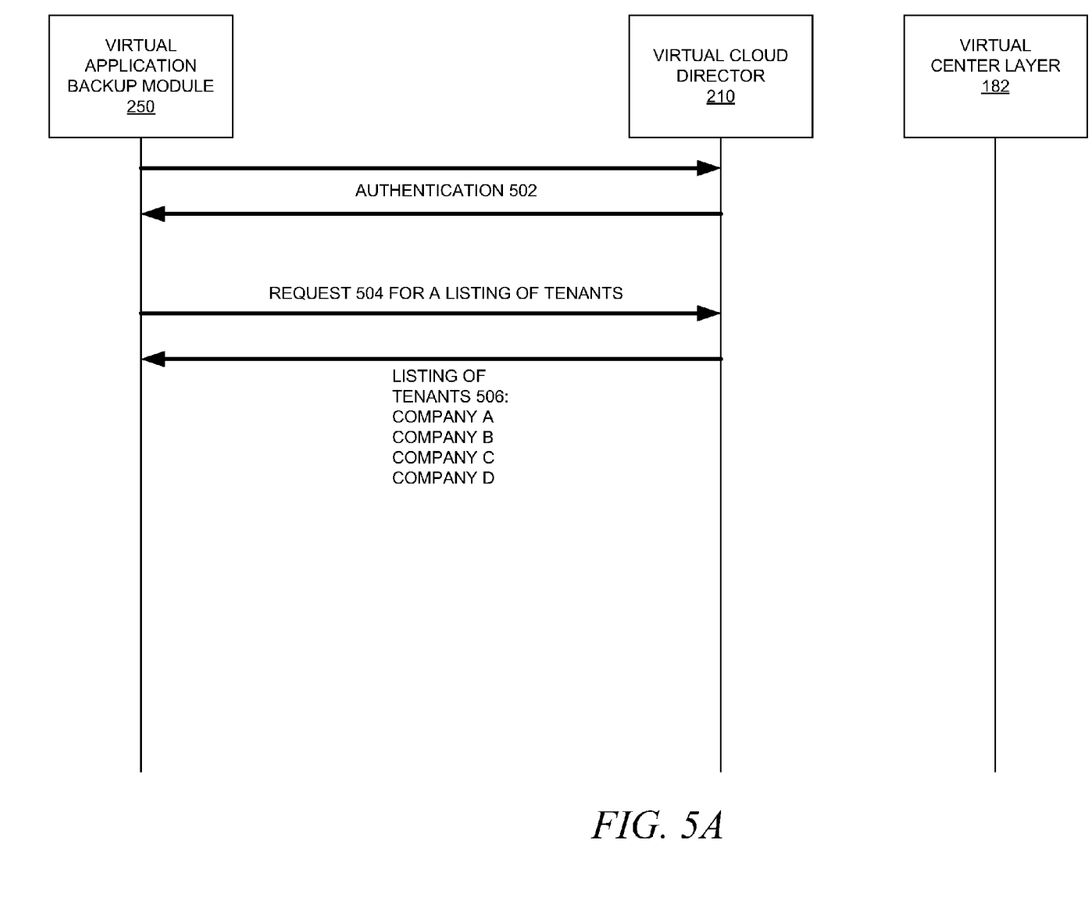
FIGS. 5A-5E depict a number of message sequencing diagrams illustrating various messages transmitted in the identification of a virtual application for backup in a cloud computing system, in accordance with some embodiments of the present invention.

FIGS. 5A-5E depict a number of message-sequencing diagrams illustrating various messages transmitted in the identification of a virtual application for backup in a cloud computing system, in accordance with some embodiments of the present invention. As depicted in FIG. 5A, the message sequencing diagram illustrates a virtual application backup module 250, a virtual cloud director 210, and a virtual center layer 182. Initially, the virtual application backup module 250 initiates a session with a virtual cloud director 210, and the initiation of the session includes authentication 502, which may be done through use of login passwords, exchange of tokens, or other authentication methodologies. The virtual application backup module 250 identifies a request to back up a particular virtual application (e.g., a virtual application object). For example, a tenant may make a request to the virtual application backup module 250 to back up a particular virtual application.

With instructions to back up a particular virtual application, the virtual application backup module 250 transmits a request 504 to the virtual cloud director 210 for a listing of tenants. In response to the request 504, the virtual cloud director 210 transmits a listing of tenants 506 that provides identification of one or more tenants to the virtual application backup module 250. In this example, the listing of tenants 506 identifies Companies A, B, C, and D. In one embodiment, the query and response messages (e.g., request 504, listing of tenants 506, and other messages described below) transmitted between the virtual application backup module 250 and the virtual cloud director 210 may be by way of Representational State Transfer (REST) application programming interface. In another embodiment, the query and response messages may be transmitted by way of Simple Object Access Protocol (SOAP).

Figure 5B:
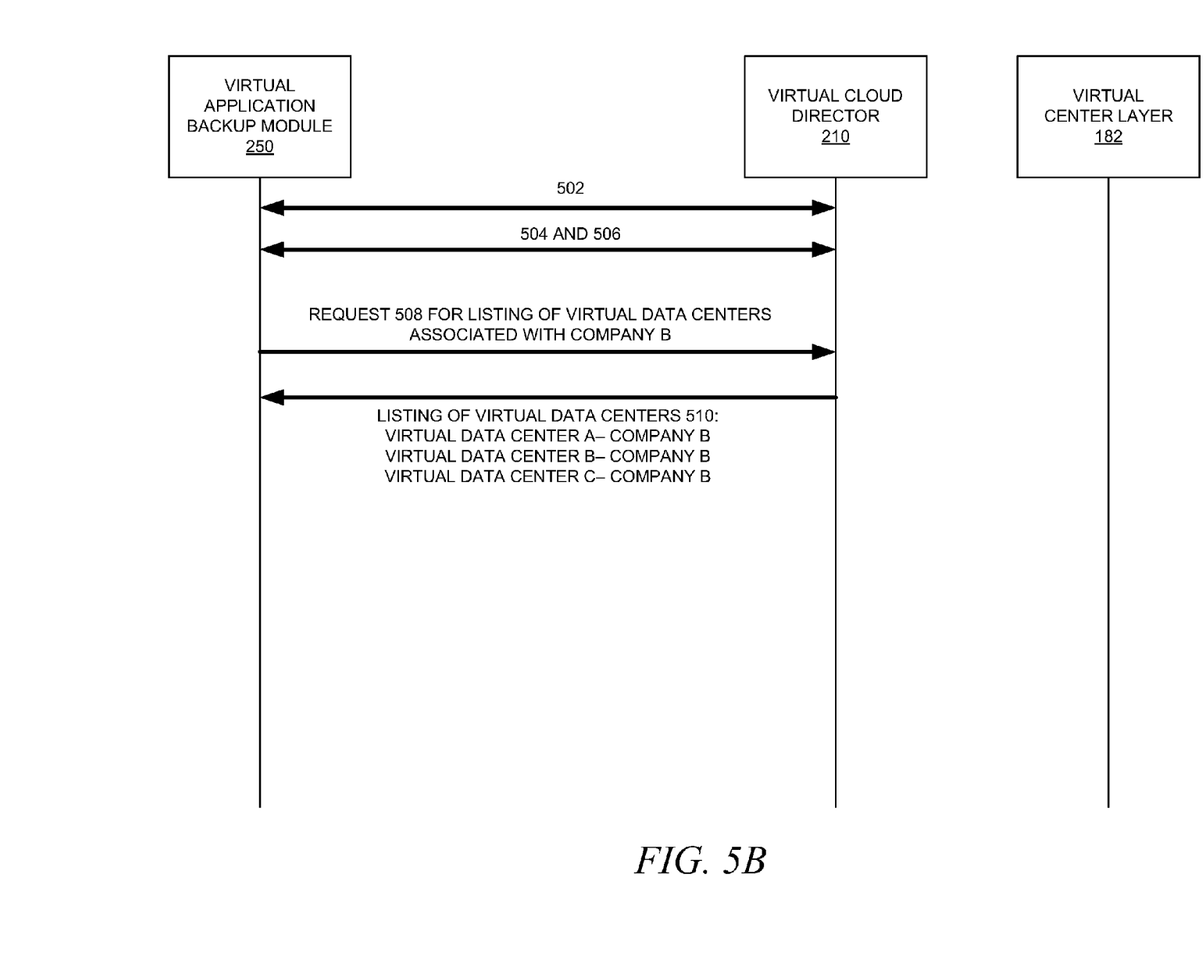

As depicted in FIG. 5B, after the virtual application backup module 250 receives the listing of tenants 506, the virtual application backup module 250 transmits another request 508 for a listing of virtual data centers associated with a particular tenant that initiated the backup request. For example, the "Company B" tenant initiated the backup request, and therefore, the virtual application backup module 250 transmits the request 508 for a listing of virtual data centers associated with Company B. In response to the request 508, the virtual cloud director 210 transmits to the virtual application backup module 250 the listing of virtual data centers 510 that provides identification of one or more virtual data centers associated with Company B. In this example, the listing of virtual data centers 510 associated with Company B identifies Virtual Data Centers A, B, and C.

Figure 5C:
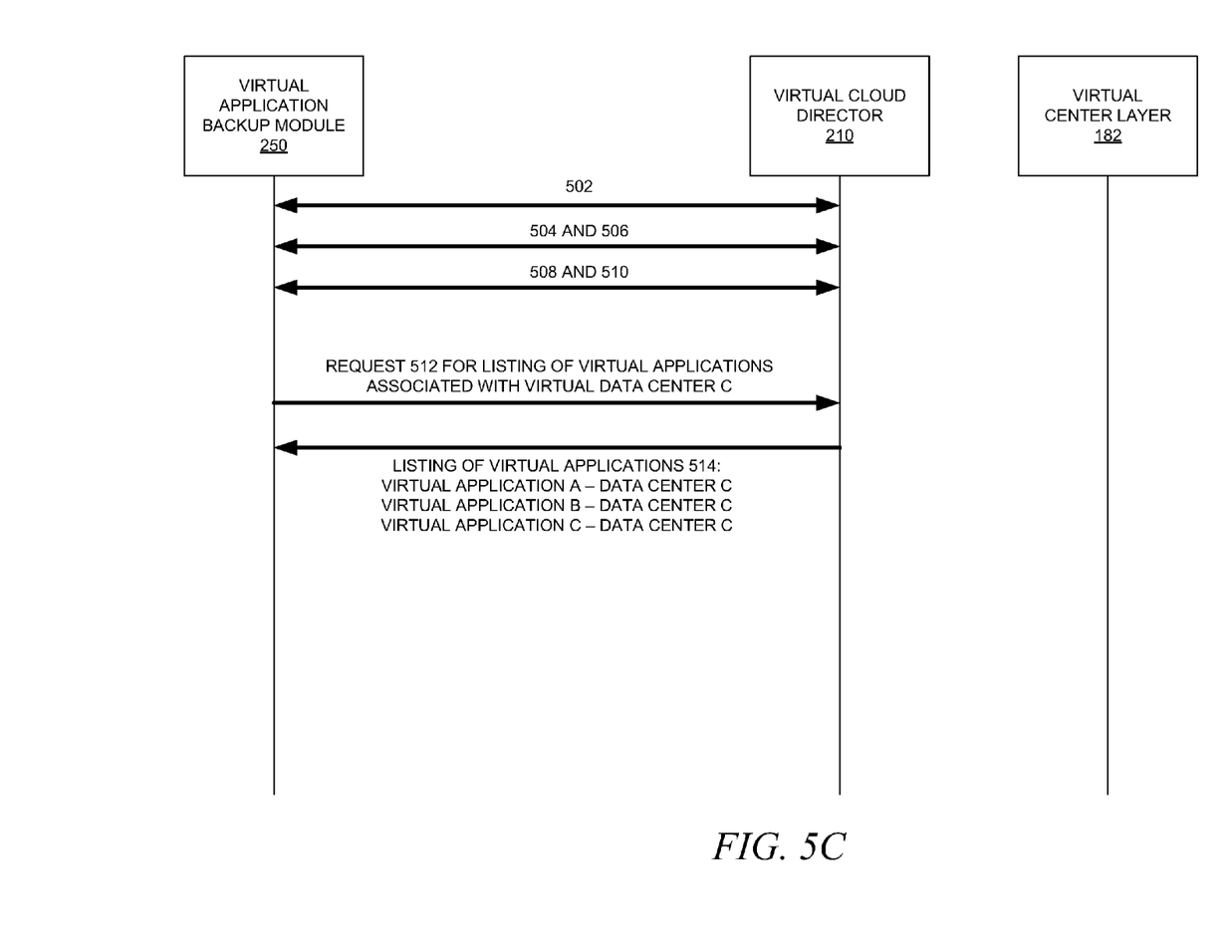

In reference to FIG. 5C, after receipt of the listing of virtual data centers associated with Company B, the virtual application backup module 250 transmits yet another request 512 to the virtual cloud director 210 for a listing of virtual applications (e.g., a listing of virtual data application objects) associated with each virtual data center. In response to the request 512, the virtual cloud director 210 transmits to the virtual application backup module 250 the listing of virtual applications 514 that provides the identification of virtual applications associated with each virtual data center. For example, FIG. 5C illustrates the transmission of a request 512 for a listing of virtual applications 514 associated with Virtual Data Center C. In response, the virtual application backup module 250 receives a listing of virtual applications 514, identifying Virtual Applications A, B, and C. The virtual application backup module 250 can make the same type of request 512 for each Virtual Data Center A or B.

Figure 5D:
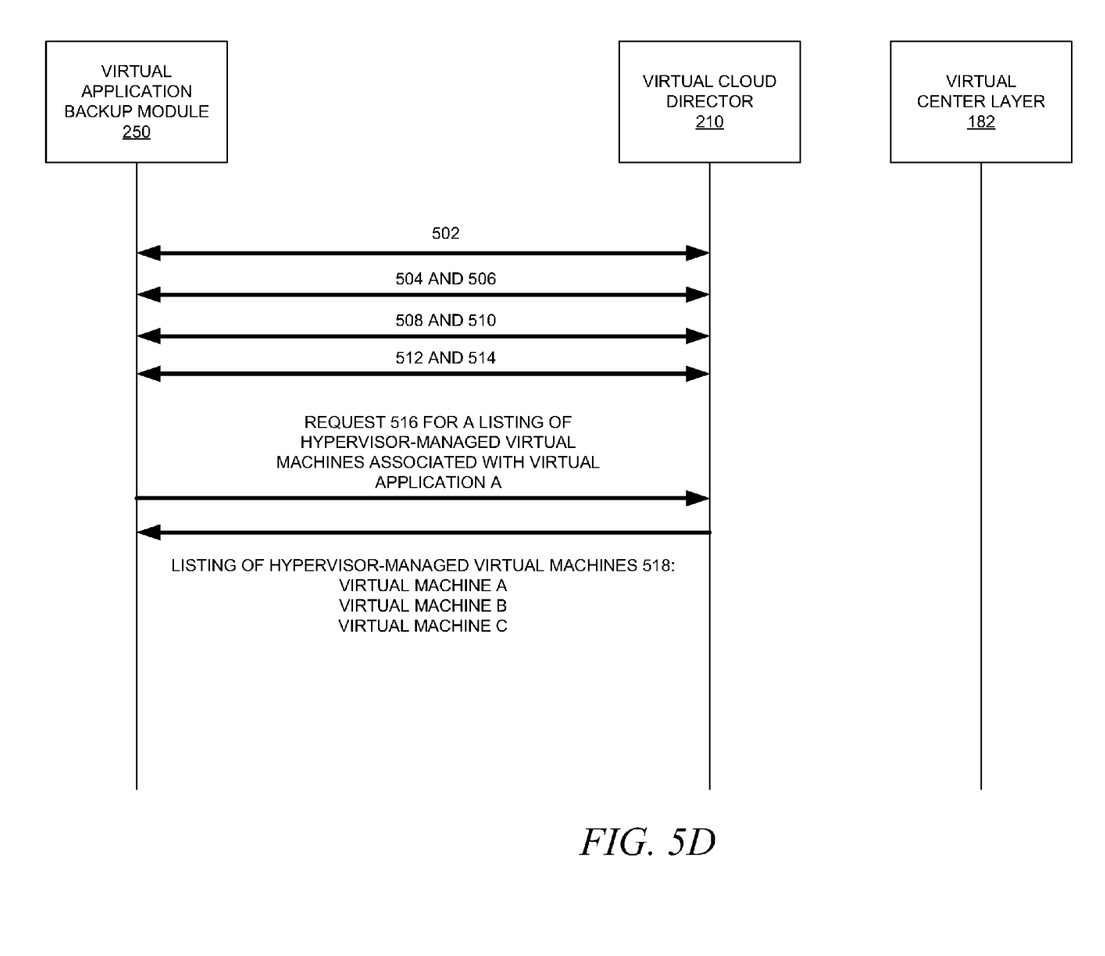

Now referencing FIG. 5D, after receipt of the listing of virtual applications 514, the virtual application backup module 250 transmits a further request 516 for a listing of hypervisor-managed virtual machines (e.g., a listing of hypervisor-managed virtual machine objects) associated with each of the virtual applications identified from the listing. In response, the virtual cloud director 210 transmits a listing of hypervisor-managed virtual machines 518 to the virtual application backup module 250 that provides identification of one or more hypervisor-managed virtual machines. It should be noted that this listing of hypervisor-managed virtual machines 518 is used by the virtual applications to identify the hypervisor-managed virtual machines. In other words, the identification of hypervisor-managed virtual machines in the listing of hypervisor-managed virtual machines 518 is recognizable by the virtual applications. Again, hypervisor-managed virtual machines are to be identified because they are subcomponents of one or more virtual applications, which are to be backed up.

In the example depicted in FIG. 5D, the virtual application backup module 250 transmits a request 516 to the virtual cloud director 210 for a listing of hypervisor-managed virtual machines associated with Virtual Application A. In response, the virtual cloud director 210 transmits to the virtual application backup module 250 a listing of hypervisor-managed virtual machines 518 that includes hypervisor-managed Virtual Machines A, B, and C.

With this listing of hypervisor-managed virtual machines 518, the virtual application backup module 250 is able to identify hypervisor-managed virtual machines (e.g., virtual machines A, B, and C) that are associated with a particular virtual application. However, as discussed above, the listing of hypervisor-managed virtual machines 518 includes identification of hypervisor-managed virtual machines that are recognizable by the virtual applications. In order to actually expose the hypervisor-managed virtual machines at the virtual center layer level, the virtual application backup module 250 transforms the listing of hypervisor-managed virtual machines 518 into attributes (e.g., names and pointers) that the virtual cloud director 210 can use to identify the hypervisor-managed virtual machines. Examples of various transformation techniques are described in more detail below.

With the hypervisor-managed virtual machines exposed after the transformation, the virtual application backup module 250 then verifies that the exposed hypervisor-managed virtual machines actually correspond to the particular virtual application that was initially identified for backup. It should be noted that the cloud service layer is separate from the virtual center layer 182, and therefore, the cloud service layer and the virtual center layer 182 may reference different hypervisor-managed virtual machines. Therefore, the virtual application backup module 250 may confirm that both the cloud service layer and the virtual center layer 182 can identify the same hypervisor-managed virtual machines after the transformation. In the verification, the virtual application backup module 250 may query the cloud service layer (e.g., a virtual cloud director 210) to determine whether the cloud service layer can locate the identifiers of the hypervisor-managed virtual machines. If the cloud service layer can not identify the same hypervisor-managed virtual machines, then the virtual application backup module 250 may report an error in the verification. For example, if the hypervisor-managed virtual machine "'Win2K8R2-1" is visible to the virtual could director 210 but does not exist at the virtual center layer 182, then the virtual application backup module 250 can report an error in the verification.

Figure 5E:
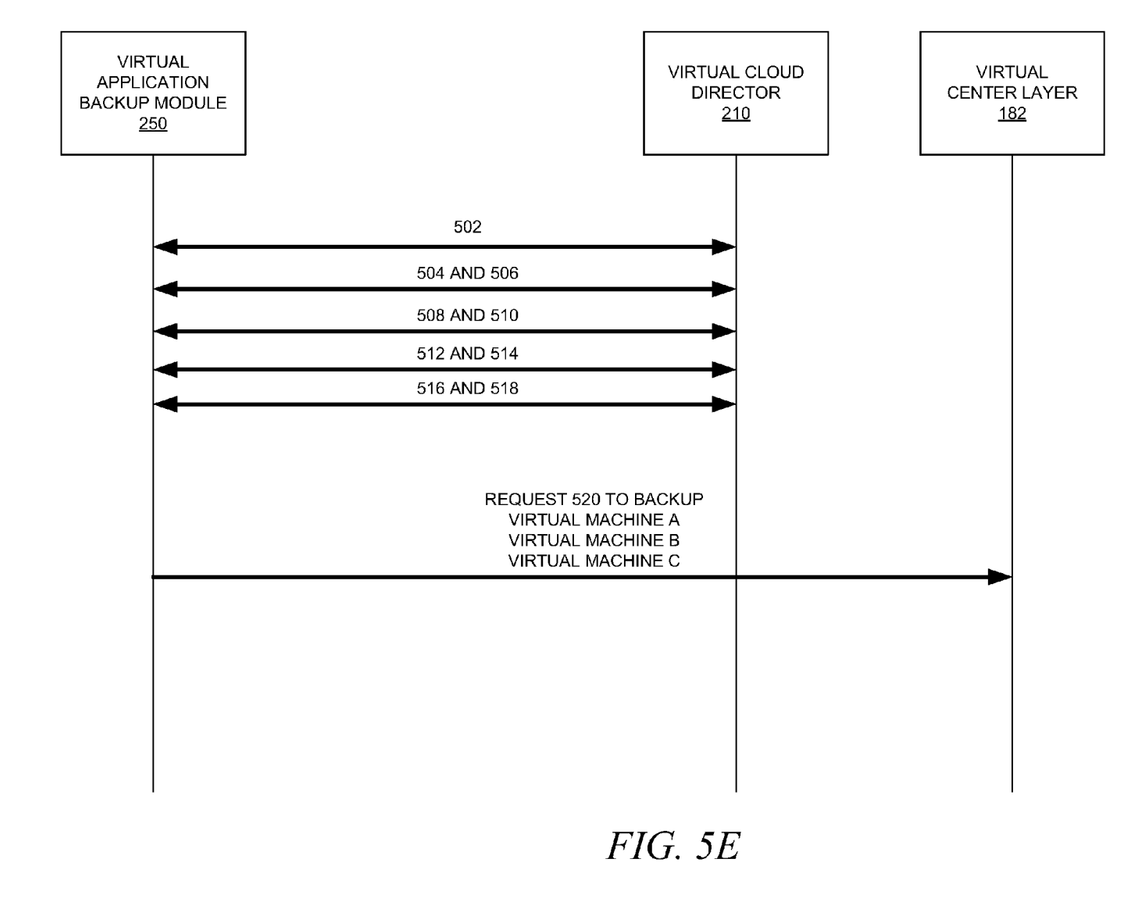

As depicted in FIG. 5E, with the hypervisor-managed virtual machines associated with a virtual application exposed, the virtual application backup module 250 then transmits a request 520 to the virtual center layer 182 to back up the identified hypervisor-managed virtual machines. As discussed above, the request 520 may include a listing of names of hypervisor-managed virtual machines (e.g., Virtual Machines A, B, and C) recognizable by the virtual center layer 182.

Figure 6:
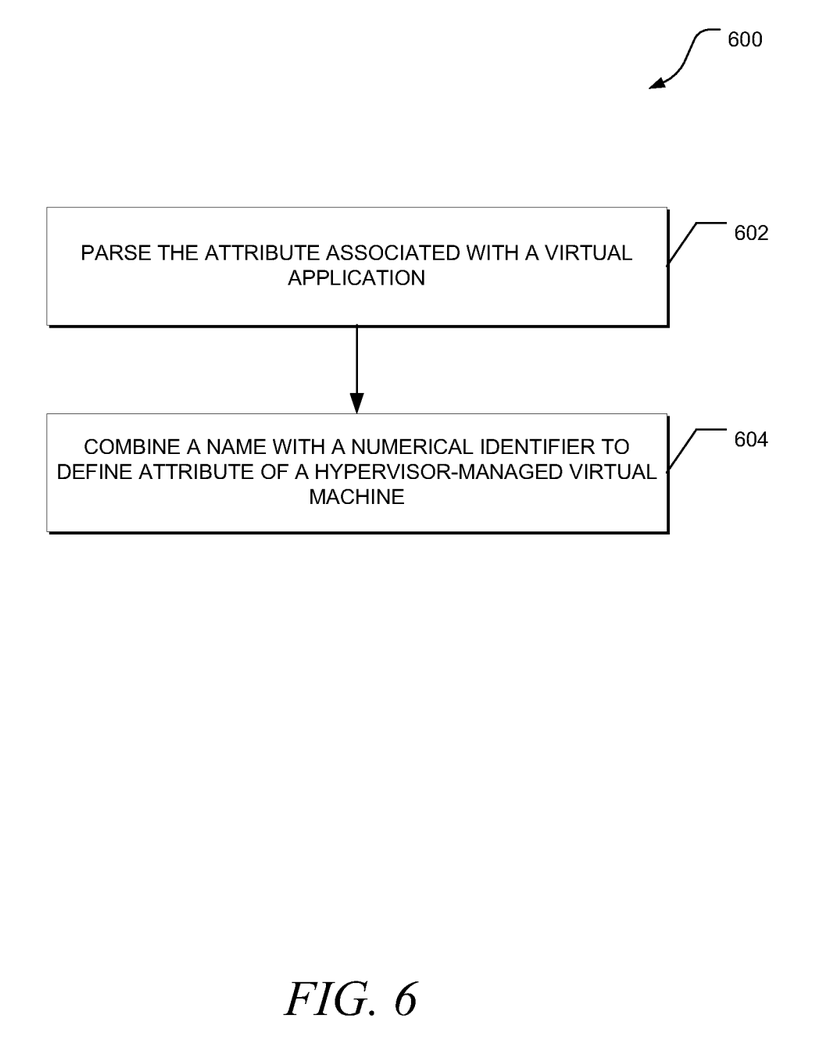
FIG. 6 depicts a flow diagram of a more detailed overview of a method, in accordance with an exemplary embodiment, for transforming attributes.

FIG. 6 depicts a flow diagram of a more detailed overview of a method 600, in accordance with an exemplary embodiment, for transforming attributes. In an exemplary embodiment, the method 600 may be implemented by the transformation engine module 306 and employed in the virtual application backup module 250 depicted in FIG. 3. In an embodiment, as depicted in FIG. 6, the virtual application backup module 250 receives an attribute associated with the virtual application and then parses, at 602, the attribute to identify a name and a numerical identifier of one or more hypervisor-managed virtual machines. This name and numerical identifier are used by a virtual application to identify the hypervisor-managed virtual machine. With the name and numerical identifier extracted, the virtual application backup module 250 then combines, at 604, the name with the numerical identifier to define a different attribute of a hypervisor-managed virtual machine that is used by the virtual center layer to identify the hypervisor-managed virtual machine.

As an example, in response to a query, a virtual application backup module receives the attribute (or response) associated with the virtual application, the attribute of which is depicted in the following Table A:

TABLE A

```
'Vm',
[
  {
    'href' => 'https://10.61.177.237/api/v1.0/vApp/vm-1592637430',
    'status' => '8',
    'name' => 'Win2K8R2-1',
    'type' => 'application/vnd.vmware.vcloud.vm+xml',
    'deployed' => 'false'
  },
  0,
```

The virtual application backup module 250 can parse the attribute depicted in Table A to identify a numerical identifier "1592637430" and a name "Win2K8R2-1." The attribute depicted in Table A is used by the virtual application and therefore is not recognizable by the virtual center layer. In other words, the virtual center layer cannot use this attribute to identify the virtual application. To transform the attribute depicted in Table A to an attribute recognizable by the virtual center layer, the name is combined with the numerical identifier, with the numerical identifier located before the name, to define "1592637430-Win2K8R2-1." The virtual center layer can use this "1592637430-Win2K8R2-1" to identify a hypervisor-managed virtual machine associated with a virtual application.

In closing, as discussed above, to back up a particular virtual application, hypervisor-managed virtual machines associated with a virtual application are identified. In the identification, the cloud service layer is queried for a listing of virtual applications. In response to the query, an attribute associated with the virtual application is received from the cloud service layer. An example of such an attribute includes a listing of hypervisor-managed virtual machines that are associated with the particular virtual application. Upon receipt, the attribute is then transformed into a different attribute associated with a hypervisor-managed virtual machine. An example of this different attribute can include a listing of identifiers used by the virtual center layer to identify each of the hypervisor-managed virtual machines. The transformation therefore exposes the otherwise hidden hypervisor-managed virtual machines that are associated with a particular virtual application. With the hypervisor-managed virtual machines identified, a request can then be made to the virtual center layer to back up the identified hypervisor-managed virtual machines.

Figure 7:
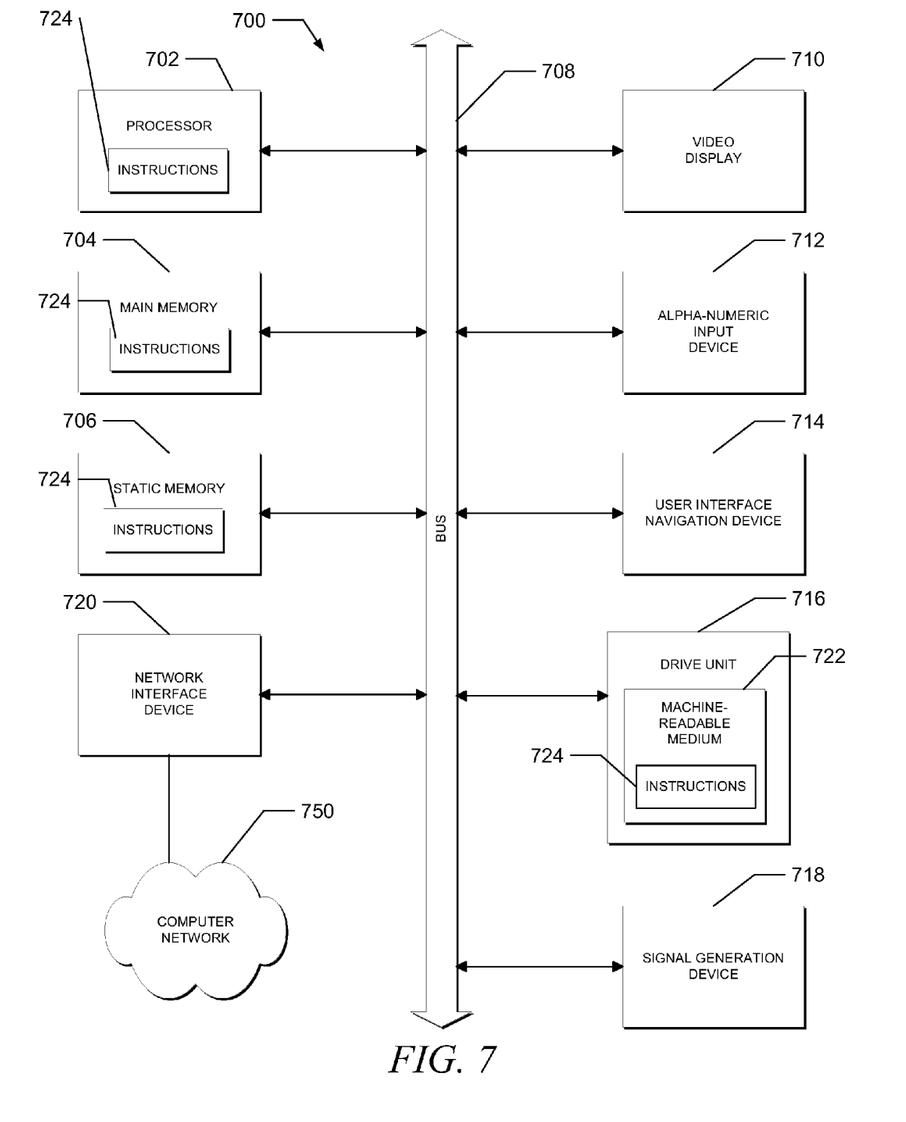
FIG. 7 depicts a hardware block diagram of a machine in the example form of a processing system within which may be executed a set of instructions for causing the machine to perform any one or more of the methodologies discussed herein.

FIG. 7 depicts a hardware block diagram of a machine in the example form of a processing system 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network system.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU) or both), a main memory 704 (e.g., random access memory), and static memory 706 (e.g., static random-access memory), which communicate with each other via bus 708. The processing system 700 may further include video display unit 710 (e.g., a plasma display, a liquid crystal display (LCD) or a cathode ray tube (CRT)). The processing system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by processing system 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In exemplary embodiments, one or more computer systems (e.g., the processing system 300) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some exemplary embodiments, the processors 702 may be located in a single location (e.g., within a home system, an office system or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for identifying virtual applications for backup may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of identifying a virtual application for backup in a cloud computing system comprising a cloud service layer and a virtual center layer, the cloud service layer comprising one or more virtual applications, the virtual center layer comprising one or more hypervisor-managed virtual machines, the method being performed at the virtual center layer and the method comprising:

receiving, at the virtual center layer, a backup request from a tenant of the cloud computing system to back up a virtual application;

in response to receiving the backup request, querying the cloud service layer for a listing of virtual applications, wherein querying the cloud service layer comprises:

transmitting a first request to the cloud service layer for a listing of tenants;

receiving an identification of the tenant from the cloud service layer in response to the transmittal of the first request;

in response to receiving the identification of the tenant, transmitting a second request to the cloud service layer for a listing of virtual data centers associated with the tenant;

receiving an identification of a virtual data center from the cloud service layer in response to the transmittal of the second request;

in response to receiving the identification of the virtual data center, transmitting a third request to the cloud service layer for the listing of virtual applications associated with the virtual data center; and wherein receiving the attribute associated with the virtual application from the cloud service layer includes receiving an identification of the virtual application from the cloud service layer in response to the transmittal of the third request; and in response to querying the cloud service layer for the listing of virtual applications, receiving, at the virtual center layer, an attribute associated with the virtual application from the cloud service layer , the attribute associated with the virtual application being used, at the virtual center layer, to identify a hypervisor-managed virtual machine associated with the virtual application;

parsing the attribute associated with the virtual application to identify a name and a numerical identifier of the hypervisor-managed virtual machine, the name and the numerical identifier being used by the virtual application to identify the hypervisor-managed virtual machine;

combining the name with the numerical identifier to define an attribute associated with the hypervisor-managed virtual machine; and backing up the virtual application based on the attribute of the hypervisor-managed virtual machine.

2. The method of claim 1, wherein the tenant is a user having a set of data that remain logically isolated from data that belongs to other tenants in the listing of tenants.

3. The method of claim 1, wherein the virtual application is a logical entity comprising a number of virtual machines that encapsulate a component of a multi-tier application.

4. The method of claim 1, wherein the numerical identifier is located before the name.

5. The method of claim 1, wherein the cloud service layer comprises a virtual cloud director, and wherein querying the cloud service layer comprises querying the virtual cloud director, and wherein receiving the attribute associated with the virtual application comprises receiving the attribute associated with the virtual application from the virtual cloud director.

6. The method of claim 1, wherein the cloud service layer is queried by way of a Simple Object Access Protocol (SOAP).

7. The method of claim 1, wherein the attribute associated with the hypervisor-managed virtual machine is a pointer to the hypervisor-managed virtual machine, the pointer being used by a virtual center to identify the hypervisor-managed virtual machine.

8. A non-transitory, machine-readable medium that stores instructions that, when performed by a machine at a virtual center layer of a cloud computing system, cause the machine to perform operations comprising:
   receiving, at the virtual center layer, a backup request from a tenant of the cloud computing system to back up a virtual application;
   in response to receiving the backup request, querying the cloud service layer of the cloud computing system for a listing of virtual applications, wherein querying the cloud service layer comprises:
      transmitting a first request to the cloud service layer for a listing of tenants;
      receiving an identification of the tenant from the cloud service layer in response to the transmittal of the first request;
      in response to receiving the identification of the tenant, transmitting a second request to the cloud service layer for a listing of virtual data centers associated with the tenant;
      receiving an identification of a virtual data center from the cloud service layer in response to the transmittal of the second request;
      in response to receiving the identification of the virtual data center, transmitting a third request to the cloud service layer for the listing of virtual applications associated with the virtual data center; and
      wherein the instructions cause the machine to receive the attribute associated with the virtual application from the cloud service layer by receiving the identification of the virtual application from the cloud service layer in response to the transmittal of the third request;
   in response to querying the cloud service layer for the listing of virtual applications, receiving, at the virtual center layer, an identification of the virtual application from the cloud service layer, the identification being used, at the virtual center layer, to identify a hypervisor-managed virtual machine associated with the virtual application;
   parsing the identification of the virtual application to identify a name and a numerical identifier of the hypervisor-managed virtual machine, the name and the numerical identifier being used by the virtual application to identify the hypervisor-managed virtual machine;
   combining the name with the numerical identifier to define the attribute associated with the hypervisor-managed virtual machine; and
   backing up the virtual application based on the attribute of the hypervisor-managed virtual machine.

9. The non-transitory, machine-readable medium of claim 8, wherein the cloud service layer comprises a virtual cloud director, and wherein the instructions cause the machine to query the cloud service layer by querying the virtual cloud director, and wherein the instructions cause the machine to receive the identification of the virtual application by receiving the identification of the virtual application from the virtual cloud director.

10. The non-transitory, machine-readable medium of claim 8, wherein the cloud service layer is queried by way of a Representational State Transfer (REST) application programming interface.

11. The non-transitory, machine-readable medium of claim 8, wherein the attribute associated with the hypervisor-managed virtual machine is a pointer to the hypervisor-managed virtual machine, the pointer being used by a virtual center to identify the hypervisor-managed virtual machine.

12. A system to identify a virtual application for backup in a cloud computing system comprising a cloud service layer and a virtual center layer, the cloud service layer comprising one or more virtual applications, the virtual center layer comprising one or more hypervisor-managed virtual machines, the system comprising:
   a processor; and
   one or more memory resources storing instructions that, when executed by the processor, cause the processor to:
      receive, at the virtual center layer, a backup request from a tenant of the cloud computing system to back up a virtual application;
      in response to receiving the backup request, query the cloud service layer for a listing of virtual applications, wherein querying the cloud service layer comprises:
         transmitting a first request to the cloud service layer for a listing of tenants;
         receiving an identification of the tenant from the cloud service layer in response to the transmittal of the first request;
         in response to receiving the identification of the tenant, transmitting a second request to the cloud service layer for a listing of virtual data centers associated with the tenant;
         receiving an identification of a virtual data center from the cloud service layer in response to the transmittal of the second request;
         in response to receiving the identification of the virtual data center, transmitting a third request to the cloud service layer for the listing of virtual applications associated with the virtual data center; and
         wherein the instructions cause the processor to receive the attribute associated with the virtual application from the cloud service layer by receiving an identification of the virtual application from the cloud service layer in response to the transmittal of the third request;
      in response to querying the cloud service layer for the listing of virtual applications, receive, at the virtual center layer, an attribute associated with the virtual application from the cloud service layer, the attribute associated with the virtual application being used, at the virtual center layer, to identify a hypervisor-managed virtual machine associated with the virtual application;
      parse the attribute associated with the virtual application to identify a name and a numerical identifier of the hypervisor-managed virtual machine, the name and the numerical identifier being used by the virtual application to identify the hypervisor-managed virtual machine;
      combine the name with the numerical identifier to define the attribute associated with the hypervisor-managed virtual machine; and
      back up the virtual application based on the attribute of the hypervisor-managed virtual machine.

13. The system of claim 12, wherein the cloud service layer comprises a virtual cloud director, and wherein the instructions cause the processor to query the cloud service layer by querying the virtual cloud director, and wherein the instructions cause the processor to receive the attribute associated with the virtual application by receiving the attribute associated with the virtual application from the virtual cloud director.

\* \* \* \* \*